United States Patent
Verhoeven

(10) Patent No.: US 9,010,576 B2
(45) Date of Patent: Apr. 21, 2015

(54) BEVERAGE DISPENSER

(75) Inventor: Romanus Eduard Verhoeven, Heerhugowaard (NL)

(73) Assignee: Bravilor Holding B.V. (NL)

( * ) Notice: Subject to any disclaimer, the term of this patent is extended or adjusted under 35 U.S.C. 154(b) by 111 days.

(21) Appl. No.: 12/995,135

(22) PCT Filed: May 26, 2009

(86) PCT No.: PCT/NL2009/050291
§ 371 (c)(1),
(2), (4) Date: Nov. 29, 2010

(87) PCT Pub. No.: WO2009/145625
PCT Pub. Date: Dec. 3, 2009

(65) Prior Publication Data
US 2011/0079611 A1    Apr. 7, 2011

(30) Foreign Application Priority Data

May 27, 2008   (NL) ...................................... 2001620

(51) Int. Cl.
*A47J 31/56*    (2006.01)
*A47J 31/40*    (2006.01)
*A47J 41/02*    (2006.01)

(52) U.S. Cl.
CPC ................ *A47J 31/56* (2013.01); *A47J 31/401* (2013.01); *A47J 41/02* (2013.01)

(58) Field of Classification Search
CPC .................................. A47J 41/02; A47J 31/56
USPC .......................... 222/131, 129.3, 146.5, 145.6
See application file for complete search history.

(56) References Cited

U.S. PATENT DOCUMENTS

| | | | | |
|---|---|---|---|---|
| 1,436,009 | A | * | 11/1922 | Butterfield ................. 366/182.4 |
| 4,191,101 | A | | 3/1980 | Ogawa et al. |
| 4,624,395 | A | | 11/1986 | Baron et al. |
| 7,299,948 | B2 | * | 11/2007 | Walton et al. ............... 222/146.5 |
| 2006/0261088 | A1 | * | 11/2006 | Chin .............................. 222/131 |

FOREIGN PATENT DOCUMENTS

| | | |
|---|---|---|
| EP | 0 811 345 A1 | 12/1997 |
| JP | 2005 316560 A | 11/2005 |
| WO | 2005/004684 | 1/2005 |

* cited by examiner

*Primary Examiner* — Donnell Long
(74) *Attorney, Agent, or Firm* — Meyer IP Law Group

(57) ABSTRACT

A beverage dispenser for preparing a warm instant drink has a heating unit for warm water, a container holder for instant-ingredient, a mixing unit for mixing instant-ingredient from the container holder with warm water from the heating unit, and a nozzle for supplying the prepared beverage.

21 Claims, 4 Drawing Sheets

BEVERAGE DISPENSER

Figure 1:
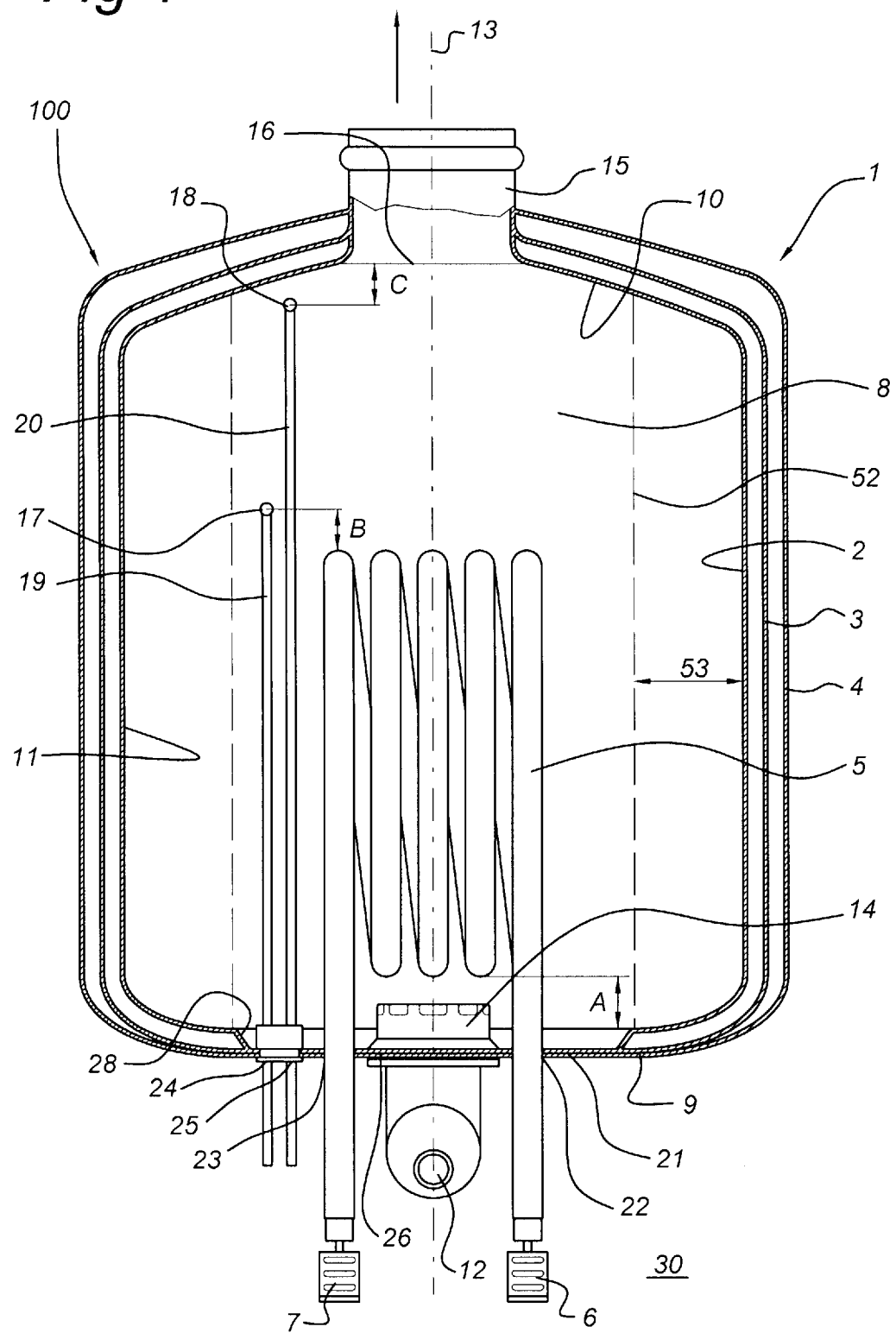

The invention relates to a beverage dispenser for preparing a warm instant drink, wherein the beverage dispenser comprises:
- a heating unit for warm water;
- a container holder for instant-ingredient;
- a mixing unit for mixing instant ingredient from the container holder with warm water from the heater unit;
- a nozzle for delivering the beverage.

Such a beverage dispenser is well known, for example from NL 1.013.769. Known beverage dispensers have the heater unit arranged to dispense warm water at all time in order to deliver a warm instant drink with a short waiting time. The water in the heater unit is permanently held at a desired temperature, resulting in a heat loss costing a relatively high amount of energy. Further, when warm water is dispensed for use, the heater unit should be refilled with new water and the water should be heated quickly in order to maintain the temperature of the warm water supply at a desired level.

The current invention aims to provide a beverage dispenser according to the preamble of claim 1, wherein a supply of a quantity of warm water having a desired temperature is provided in an efficient manner, even when warm drinks are dispensed from the beverage dispenser.

It is a further goal of the invention to provide a beverage dispenser, which can be readily manufactured and having operational certainty. It is a specific goal to provide a beverage dispenser comprising a vessel with double walls, wherein the chance of a leakage to the surroundings is reduced through an isolating material contained within the double walls or from an under pressure present between the walls.

This goal is achieved according to the invention by providing a beverage dispenser for preparation of a warm instant drink, wherein the beverage dispenser comprises:
- a heater unit for warm water;
- a container holder for instant-ingredient;
- a mixing unit for mixing instant-ingredient from the container holder with warm water from the heating unit;
- a nozzle for delivering the beverage;

wherein the beverage dispenser according to the invention is characterized by the heating unit comprising:
- a closed vessel surrounded at all sides by a vessel wall with a lower side formed by a bottom, an upper side formed by a ceiling and a vertical centre line extending between the lower side and upper side in a vertical direction;
- a heating element;
- a water inlet for discharging through an inlet opening into the interior of the vessel;
- a water outlet for discharging through an outlet opening from the interior of the vessel;

that the heating element is positioned in the interior of the vessel at a distance above the bottom;
that the inlet opening, in a vertical direction, lies below the heating element;
the outlet opening, in the vertical direction, lies higher than the heating element, wherein the vessel wall comprises an insert received in an insertion, formed separately from the rest of the vessel wall, the insert extending, in a direction perpendicular to the vessel wall, from the exterior of the vessel to the interior of the vessel, wherein one or more conducts of elements present in the interior of the vessel—such as a temperature sensor, water inlet, heating element, water outlet—are present in the insert.

By means of a heater unit comprising a closed vessel, a heating element, a water inlet into the vessel and a water outlet out of the vessel, it is possible to have warm water in said vessel and to refill the water supply, when warm water is delivered through said outlet, through the inlet. By means of the heating element the temperature of the water in the vessel is held at the desired temperature or, when fresh water enters, to bring the water at the desired temperature. According to the invention the heating element is provided in the interior of the vessel at a distance above the bottom of the vessel, the inlet opening of the water inlet is provided in the vessel under the heating element, and the outlet opening of the outlet is provided higher than the heating element. As is well known heat tends to raise, which results in a warm liquid layer having the tendency to lie on top of the cold liquid layer. By providing the outlet opening, through which the outlet delivers warm water from the vessel, above the heating element, it is ensured that warm water is delivered from the relatively warm part of the vessel. By providing the inlet opening, through which fresh water is provided to the vessel, under the heating element, the fresh water is supplied to the relative colder section of the vessel, while the temperature of the water in the higher, warmer section of the vessel is influenced in a relatively limited way. The fresh, relatively cold water would, as a result of physical interaction, flow to the bottom of the vessel. By supplying the relatively cold water to the lower section of the vessel, it is achieved that the fresh cold water does not pass through the warm layer near the outlet opening and prevents the warm water, which is available for delivery for preparing the beverage, from cooling down. By providing the heating element between the water outlet and the water inlet, the cold water from a bottom section of the vessel will have to pass the heating element before being able to rise to the higher warmer/heated section of the vessel. This allows to secure a "direct delivery" of heated water for beverage(s) to be prepared in an efficient manner at a desired temperature. This results not only in a higher use comfort by limiting the waiting time for delivering a hot beverage, but also results in lower power use.

For reasons of manufacturing it is advantageous to provide all conducts in the ceiling or the bottom. The conducts pass through the separately formed insert. The insert is, after placing the conducts through the insert, fixed subsequently as a whole, as it were similar to a plug, in an insertion in the vessel wall, which vessel wall can be arranged for that matter completely or almost completely closed. This advantage is in particular relevant when the vessel is a vessel with double walls, and the interspace is vacuum. This advantage is also present when the interspace is filled with an isolating gas, the gas in particularly being a gas different from air. This will allow forming a passageway through the vessel wall only for inserting the insert. This single passageway can be formed during manufacturing of the vessel. Forming the passageway afterwards is not necessary, which would have resulted in effecting the integrity of the vessel wall, such as density against warm leakage. When the integrity of the double walls of a similar vessel is effected this will result in a loss or partial loss of its isolating properties. By placing the conducts for as far as possible through an insert and by fixing this insert as a whole in an insertion in the vessel wall, effecting the integrity of the vessel wall is prevented completely. Because of the vertical mutual relations between the elements present in the interior of the vessel—according to the invention the inlet opening lies lower than the heating element and the outlet opening lies higher than the heating element—it is advantageous to position the insert in the bottom of the vessel or in the ceiling of the vessel. For reasons to be explained in the following, it will be preferred for the conducts of the inlet, of the heating element and of temperature sensor to position these, and therefore also for the insert, in the bottom.

For reducing heat loss according to the invention it is advantageous to generally thermally isolate the vessel by thermally isolating the interior of the vessel with respect to the surroundings of the vessel. Such a thermal isolation is as such known for heating units and can be provided by packing the vessel in a thermally isolating foam or another material.

Thermal isolation of the vessel is realised according to the invention by providing the vessel with generally double walls. Between the double walls isolation material can be provided. It is also possible to fill the space between the double walls with a gas or vacuum [which is according to the technique of thermal isolation not free of gas, but a pressure substantially lower than the surrounding pressure]. For gas filled and vacuum vessels with double walls it is further advantageous to provide coat at least one of the walls of the vessel with double walls with a heat reflecting layer, such as a metal layer, in particular a metal coating comprising copper. It is practical to provide the coating in the interior space of the double wall. In case of a glass wall the layer usually comprises a coating provided on the side directed towards one of the walls. In the case of metal walls the layer can be a heat reflecting foil provided in the interspace.

According to the invention it is advantageous to provide the conduct for the water inlet in the bottom. This conduct forms a heat guide through which heat from the otherwise heat isolated vessel can escape to the exterior. By providing the conduct for the water inlet in a bottom section, that is in the colder section of the vessel, leakage of heat is minimized.

The heating element can also, in particular when it is powered off, form a source of heat leakage from the vessel. For similar reasons it is advantageous according to the invention to provide the conduct for the heating element in the bottom.

The temperature sensor can also form a source of heat leakage from the vessel. For similar reasons it is advantageous according to the invention to provide the heating unit with at least one temperature sensor provided in the interior of the vessel, and to provide the conduct for the at least one temperature sensor in the bottom.

Furthermore, also the water outlet can be a source of heat leakage from the vessel. For similar reasons it is advantageous according to the invention to provide the conduct for the water outlet in the bottom. Heat guided by the water outlet, originating from the relatively warmer section of the vessel, shall, on its way to the bottom, first have to pass the relatively colder section of the vessel and a part of the heat received from the warmer section of the vessel will be surrendered, before this heat can reach the exterior of the vessel. With respect to the water outlet it should be noted that it is also advantageous—especially when the inlet opening of the inlet is positioned in the bottom or close to the bottom of the vessel—to provide the conduct, instead of through the bottom, through the ceiling of the vessel. This will allow emptying the vessel and the beverage dispenser in a simple manner for maintenance or otherwise.

According to a further embodiment of the invention the heater unit comprises a first temperature sensor received in the interior of the vessel and a second temperature sensor received in the interior of the vessel; both temperature sensors are, considered in a vertical direction, provided above the heating element; and the first temperature sensor, considered in the vertical direction, is located closer to the heating element than the second temperature sensor. The first temperature sensor, positioned closer to the heating element, is arranged to allow control of the temperature in the vessel by controlling the heating element. The second temperature sensor can measure the temperature of the water dispensed from the vessel to keep track of its temperature and to track whether the temperature is not too low. When the temperature is too low, delivery of warm water from the vessel can be postponed. Further the second temperature sensor can be used to keep an eye on the water in the vessel to prevent it from boiling. Boiling of the water is generally considered as undesired.

For a good control of the heating element, it is advantageous according the invention to provide the first temperature sensor, considered in the vertical direction, at most 2 cm above the heating element.

For a good detection of the temperature of the warm water to be dispensed from the supply, it is advantageous according to the invention to provide the second temperature sensor, considered in a vertical direction, at most 2 cm below the outlet opening.

In order to keep the supplied fresh, relatively cold water as much as possible near the bottom and to prevent flowing of the relatively cold water towards the warmer zone, it is advantageous according to the invention to provide the inlet opening of the water inlet directed in a horizontal direction or directed downwards.

To supply the fresh, relatively cold water as low as possible in the vessel and to further optimize the above described favourable effects—of a cold water layer near the bottom and a warm water layer near a ceiling in the vessel—it is advantageous according to the invention to provide the inlet opening near the bottom, preferably near the lowest portion thereof.

According to a further embodiment of the invention the distance between the heating element and the bottom is at most 35 mm, preferably at most 30 mm, such as 25 mm or less. This will ensure that the heating element can reach the relatively cold water collected near the bottom of the vessel.

According to a further embodiment of the invention the indicated distance between the heating element and the bottom it at least 5 mm, preferably at least 8 mm, such as for example 15 mm or more. This will provide enough space (volume) for supplying and collecting fresh, relatively cold water to the bottom of the vessel and under the heating element and to raise the temperature thereof.

In order to dispense or deliver the relatively warm water from the vessel at the highest possible position, and to optimize the already indicated favourable effect, it is advantageous according to the invention to provide the outlet opening at most 1 cm under the ceiling, preferably in the ceiling (not extending downwardly from the ceiling).

Figure 2:
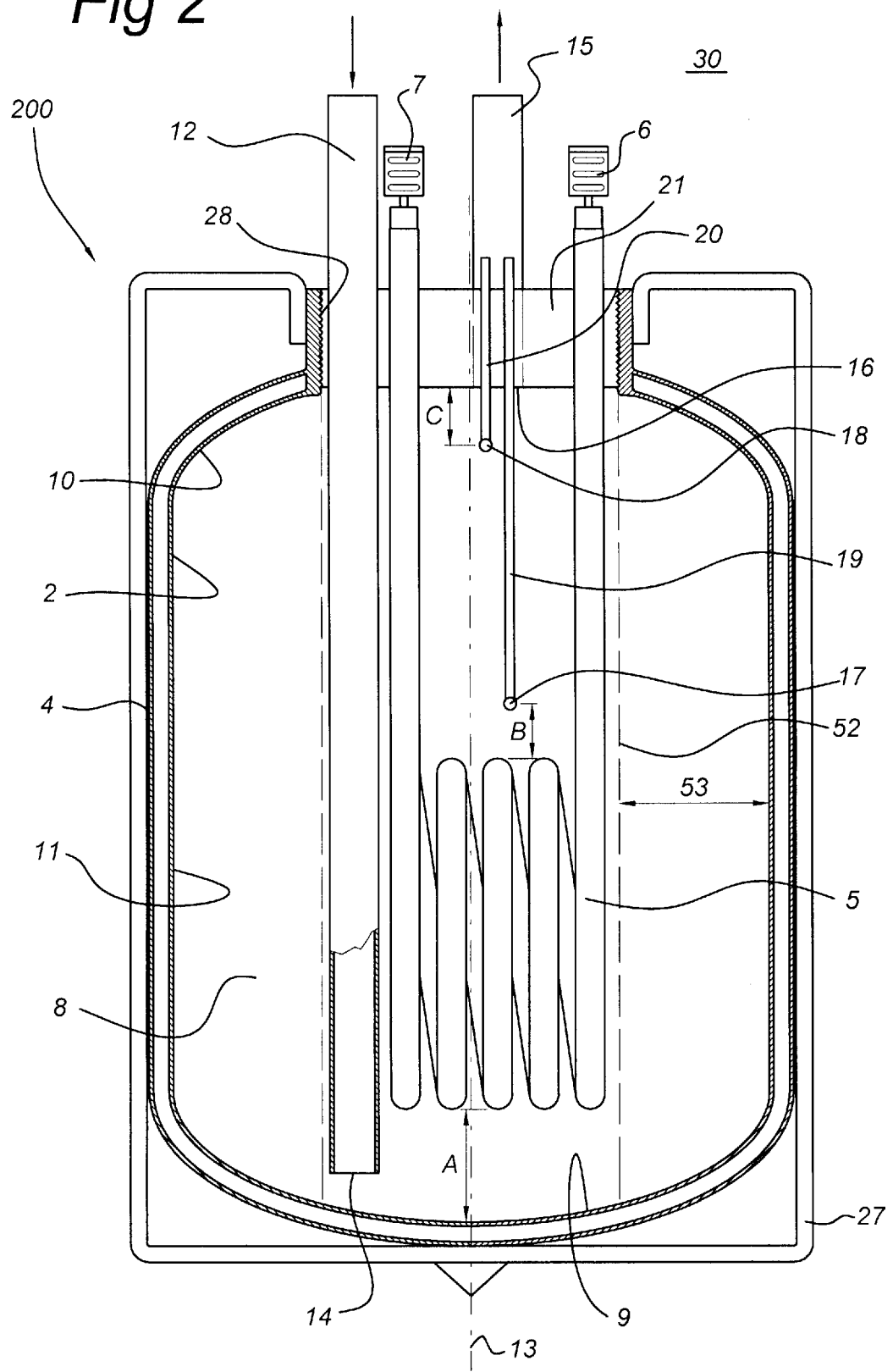
Figure 3:
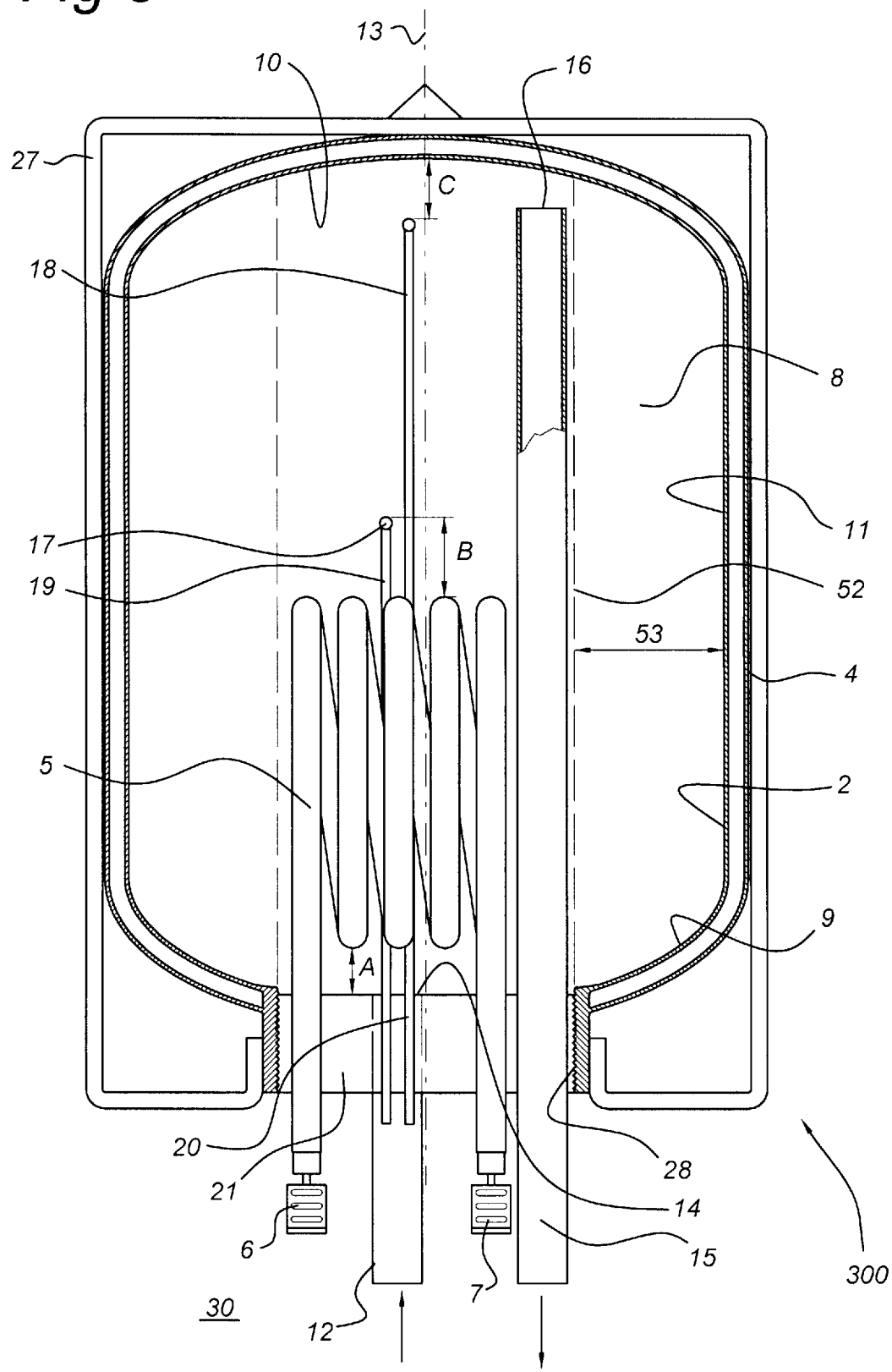
Figure 4:
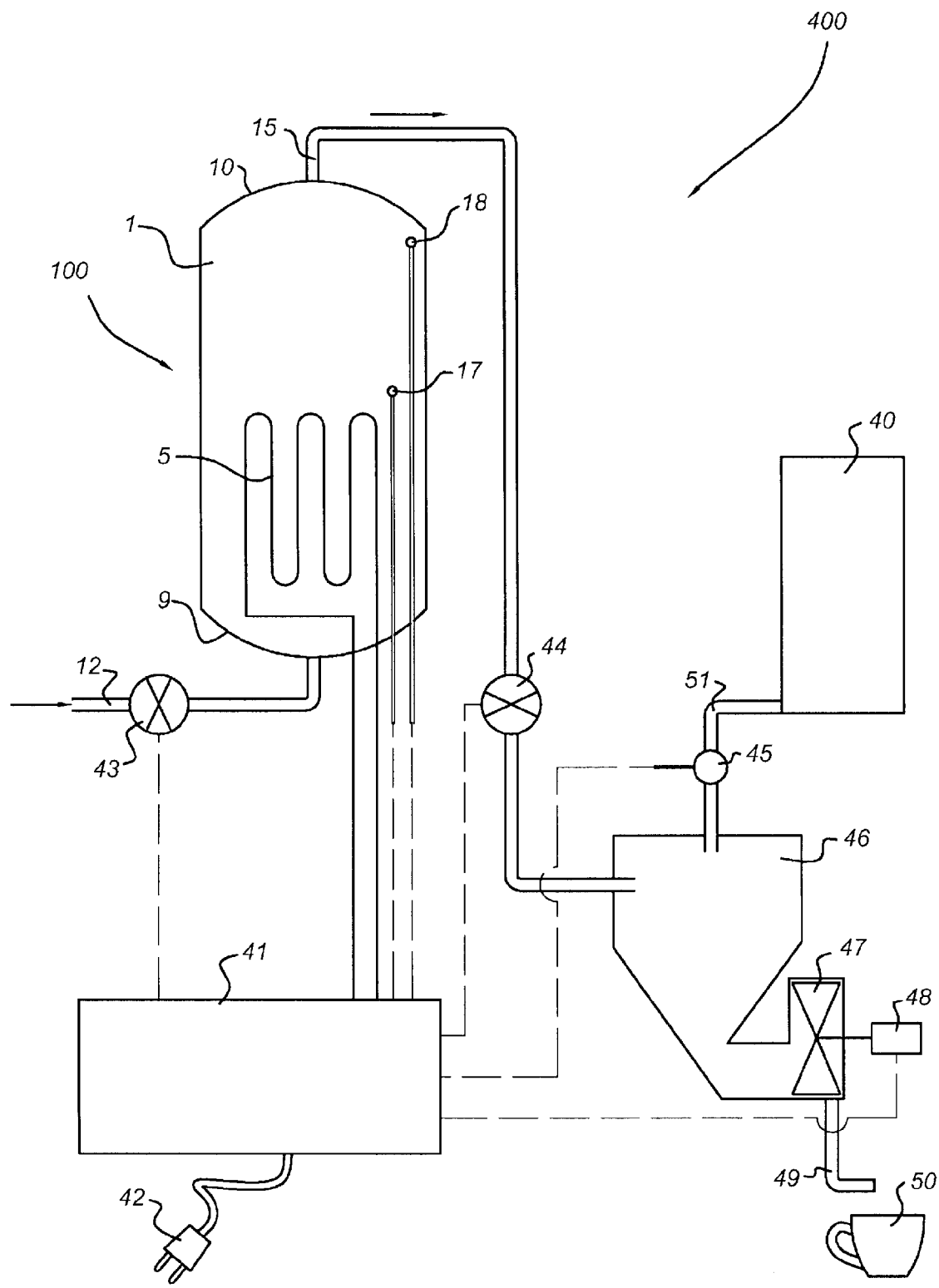

The current invention will be described using the drawing illustrating schematically embodiments of the invention. The drawing shows:

FIG. 1 showing schematically a longitudinal cross-section of a first embodiment of a heating unit for a beverage dispenser according to the invention;

FIG. 2 showing schematically a longitudinal cross-section of a second embodiment of a heating unit for a beverage dispenser according to the invention;

FIG. 3 showing schematically a longitudinal cross-section of a third embodiment of a heating unit for a beverage dispenser according to the invention; and FIG. 4 showing a further schematic view of beverage dispenser according to the invention.

FIG. 1 shows a schematic view of a first preferred embodiment of a heater unit 100 for a beverage dispenser according to the invention.

The heater unit 100 comprises a vessel 1 surrounded from all sides by a vessel wall 9, 10, 11. The vessel wall has a bottom 9 forming a lower side of the vessel, a ceiling 10, forming an upper side of the vessel, and a side wall 11 connecting the bottom 9 and the ceiling 10. The vessel is generally closed. In use the vessel is positioned vertically, i.e. the centre line 13 is positioned generally vertical. Further the vessel 1 is a vessel with double walls, in FIG. 1 a generally metal vessel 1 with an inner wall 2, an outer wall 4 and an intermediate layer 3 in between. In order to improve heat isolation the space between the inner wall 2 and outer wall 4 is vacuum, at least vacuous or arranged with lower pressure. The intermediate layer 3 is a foil, mounted at a number of locations such that it is fixed in position, but such that it has little or no connections with the interior wall 2 of the outer wall 3. Although it is possible, the intermediate layer 3 shall generally not divide the space between the interior wall 2 and the outer wall 4 in two completely separated spaces on opposite sides of the foil 3. In order to improve the heat isolation the intermediate layer 3 is in particularly arranged as a heat reflecting foil. The intermediate layer 3 is for that purpose provided on the side directed towards the vessel with a coating of a metal layer, in particular a metal layer comprising copper.

The heating unit further comprises a completely in the interior 8 of vessel 1 positioned electrical heating element 4 with electrical power terminals 6 and 7 outside the vessel 1, i.e. in the exterior surroundings 30 of the vessel 1. The distance A from (the bottom side of) the heating element 5 to the bottom 9 of the vessel 1 is in the embodiment as shown approximately 15 mm.

At the lower side of the vessel a water inlet 12 is provided with at least an inlet opening 14 in the vessel. The inlet opening 14 is opened preferably in the radial direction, i.e. perpendicular to the centre line 13, and can comprise multiple inlet openings 14. The inlet openings 14 are positioned under the heating element 5.

At the top side of the vessel 1 a water inlet 15 is provided with an outlet opening 16 through which warm water from the vessel flows into the water outlet for use for preparing a warm beverage. The outlet opening 16 is positioned in flush with ceiling 10, or at least falls inside the interior perimeter of the ceiling 10.

In the vessel 1 a first, lower temperature sensor 17 and the second, higher temperature sensor 18 are received. The first temperature sensor 17 is mounted on a support 19 arranged to be positioned at a distance B above the heating element. The distance B is at most 2 cm, such as 1 cm. The second temperature sensor 18 is mounted on a support 20 arranged such that it is positioned at a distance C under the outlet opening 16. The distance C at most 2 cm, such as 1 cm.

In order to allow simple assembly, the conducts 22, 23, 24, 25 and 26 of the heating element 8, the temperature sensors 17 and 18, and the water inlet 12, pass through or are received in an insert 21. The insert is a separate part and can be made from a plastic, metal or another material. The insert is positioned in the vessel through an insertion 28 having a diameter that is smaller than the diameter of the side wall 11 of the vessel 1 such that a horizontal space 53 exists between the side wall 11 and a vertical projection 52 extending from the insertion 28. Before the insert is mounted in the insertion 28 in the bottom of the vessel, the heating element 8, the temperature sensors 17 and 18, and the water inlet 12 are fixed to the insert, i.e. these elements are passed through the insert and fixed to it. The insert 21 with the mounted heating element 8, temperature sensors 17 and 18, and the water inlet 12 are mounted as a whole in the bottom in the bottom 9 of the vessel 1.

In the direction perpendicular to the vessel wall the insert extends from the exterior 30 of the vessel 1 into (i.e. into and incorporating) the interior 8 of the vessel 1. When the vessel is made of metal, such as stainless steel, the insert is preferably also made using the metal from which the wall of the vessel was made, in particular the same metal such as stainless steel. The insert can be (hard-)soldered or welded in the insertion. In case of hard soldering, silver can be used. By manufacturing the insert 21 from the same material as walls 2, 4 of the vessel 1, problems as a result of different coefficients of expansion are avoided and it will be possible to dispose of a separate gasket (that can leak) between the walls 2, 4 of the vessel and the insert 21.

FIG. 2 shows a second embodiment of a heating unit 200 for a beverage dispenser according to the invention. The heating unit is referred too with a separate reference numeral 200, however for convenience the same references are used for likewise parts as in FIG. 1. The major difference between heating unit 200 and heating unit 100 is that in heating unit 200 all conducts of the heating element 5, the temperature sensors 17, 18, the water inlet 12 and the water outlet 15 are arranged through the ceiling 10, in particular through an insert 21 similar to the insert 21 from FIG. 1. Other minor differences, unrelated to the indicated most important difference, are the vessel wall of vessel 1 being double walled, but an intermediate layer is not present and a mounting frame 27 is provided around vessel 1 for mounting in a beverage dispenser. The vessel 1 of heating unit 200 is made in particularly of glass. The advantage of the heating unit 100 with respect to heating unit 200 is that the heating unit 100 is relatively easy to empty without having to tip the vessel or hold the vessel upside down. Another advantage of heating unit 100 is that the conducts are provided in a bottom section of the vessel, i.e. in that section of the vessel where the heated water, held in the vessel, is relatively most coldest. The heat leakage (/losses) through the conducts will be less in heating unit 100 with respect to heating unit 200. The heating unit 200 has as an advantage that the vessel has only one passageway through the heat isolated wall, that is at the top side. Such passageways form a weak link in thermo regulating the heating unit, in particular for vessels having double walls isolated by vacuum.

FIG. 3 shows a third embodiment of a heating unit 300 for a beverage disperser according to the invention. The heating unit is referred too with separate reference number 300, however other similar parts are indicated with the same reference numerals as in FIG. 1 and FIG. 2. The vessel 1 of heating unit 300 is in particularly made of glass. The main difference with heating unit 200 from FIG. 2 is that insert 21 is provided in the heating unit 300 near bottom 9 and that as a result the heating element 5 is positioned closer to the insert 21 and the inlet and outlet—with respect to the embodiment according to FIG. 2—are mutually exchanged.

When hot water is tapped or delivered from heating units 100, 200 or 300 from a top region through water outlet 15, at the same moment or directly afterwards new, relatively cold water can be supplied through water inlet 12. The supplied colder water will not mix or will mix in a limited manner with the warmer water higher in the vessel. This will assure that the already present warm water in the top section of the vessel remains at more or less the same temperature as the warm water that was been tapped. Directly after a first portion of warm water a next portion of warm water can be tapped from the vessel. The colder water supplied near the bottom of the vessel shall pass the heating element when it rises from the bottom and will be heated to the desired temperature and will arrive and rise above the heating element at the desired temperature.

Although the vessel having double walls according to FIGS. 1, 2 and 3 can have any cross-section, the cross-section will (i.e. in a plane perpendicular to the vertical centre line 13) generally be a round shape, corresponding to the FIGS. 1 and 2.

Up to now only a heating unit according to the invention was described. The heating unit is especially intended to use in combination with a beverage dispenser according to the invention, but can also be used in another application. The current invention also comprises a heating unit separate from a beverage dispenser or another device. The invention also comprises the embodiments as shown in FIGS. 1, 2 and 3.

FIG. 4 schematically illustrates a beverage dispenser 400 according to the invention. This beverage dispenser 400 is provided with a heating unit 100 according to FIG. 1, but it will be clear that a heating unit 200 according to FIG. 2, a heating unit 300 according to FIG. 3 or another heating unit according to the invention can replace the illustrated heating unit.

The beverage dispenser 400 comprises a heating unit 100; a container holder 40 filled with an instant-ingredient for preparation of an instant drink such as coffee, tea, milk, soup, etc., a mixing unit 46; a nozzle 49 for dispensing the prepared beverage in for example a cup 50; a control unit 41 for controlling the beverage dispenser 400; a plug 42 for connecting to the power net. Several control wires are illustrated with stretch ??, but do not have a separate reference numeral.

In the water inlet 12 a pump or valve 43 is provided connected via a signal wire with the controlling unit 41 for supplying fresh, relatively cold water to the vessel 1 and allowing control thereof. Similarly the water outlet 15 is provided with a pump or valve 44 connected via a signal wire with a control unit 41 to allow controlling tapping of warm water from vessel 1.

Warm water is transported to a mixing unit 46. An instant ingredient is supplied to the mixing unit from the container holder 40. This supply is formed by a pipe 51 and is controlled by the control unit managing the transport device 45.

In the mixing unit 46 the warm water and the instant ingredient are mixed to prepare the desired instant drink to be dispensed through nozzle 49 into a cup 50. The mixing unit 46 can comprise a rotor 47 in order to control the mixing process, said rotor driven by motor 48 controlled by control unit 41.

The temperature sensors 17 and 18 are connected to control unit 41 via signal wirings. The temperature sensor 17 can be used for controlling from control unit 41 heating element 5. The temperature heat sensor 18 can be used for multiple purposes. It allows measuring the temperatures of warm water in the upper region of the vessel. When no heated water is demanded, the signal can be used for "auxiliary" control of the heating element. When heated water is demanded, this signal from temperature sensor 18 can be used for verifying the temperature of the supplied water. When the temperature of the warm water is too low, supply of the warm water can be postponed until sufficient heating is executed. Further temperature sensor 17 and/or 18 can be used for preventing boiling of the water in the vessel. Boiling of water in the vessel is not desired. When boiling is detected, the control units can take action by for example powering off the heating element.

The invention claimed is:

1. A beverage dispenser (400) for preparation of a warm instant drink, wherein the beverage dispenser (400) comprises:
   a heater unit (100, 200, 300) for warm water;
   a container holder (40) for instant-ingredient;
   a mixing unit (46) including a proximal portion connected to the heater unit (100, 200, 300) via a water outlet (15) and connected to the container holder (40) via a pipe (51), wherein the mixing unit is adapted for mixing instant-ingredient from the container holder (40) with warm water from the heating unit (100, 200);
   a nozzle (49) for delivering the beverage;
   wherein the mixing unit (46) includes a rotor (47) arranged between the proximal portion of the mixing unit and the nozzle (49) and adapted to control mixing of the instant-ingredient and the warm water;
   the heating unit (100, 200, 300) comprising:
     a closed vessel (1) having a vessel wall (9, 10, 11) with a lower side formed by a bottom (9), an upper side formed by a ceiling (10) and a vertical centre line (13) extending between the lower side and upper side in a vertical direction;
     a heating element (5);
     a water inlet (12) for discharging through an inlet opening (14) at the bottom (9) into the interior (8) of the vessel (1), wherein the inlet opening (14) is adapted to discharge cold water received from a cold water source in a radial direction relative to the vertical centre line (13); and
     the water outlet (15) for discharging through an outlet opening (16) at the ceiling (10) from the interior (8) of the vessel (1);
   that the heating element (5) is positioned in the interior (8) of the vessel (1) at a distance (A) above the bottom (9);
   that the inlet opening (14), in a vertical direction, lies below the heating element (5);
   the outlet opening (16), in the vertical direction, lies above the heating element (5);
   wherein the vessel wall comprises an insert (21) received in a single passageway of an insertion (28), the insert (21) formed separately from the rest of the vessel wall, the insert (21) extending, in a direction perpendicular to a horizontal portion of the vessel wall (9, 10, 11), from the exterior (30) of the vessel (1) to the interior (8) of the vessel (1), wherein, the vessel (1) is a vessel (1) with double walls and is thermally isolated for thermally isolating the interior (8) of the vessel (1) with respect to the surroundings of the vessel (1), conduits (22, 23, 24, 25, 26) of the water inlet (12), water outlet (15), the heating element (5) and one or more temperature sensors (17, 18) present in the interior of the vessel being received in the insert (21), wherein the double walls comprise an inner wall (2) and an outer wall (4); and
   a horizontal outer diameter of the insert (21) in the single passageway (28) is smaller than a horizontal inner diameter of the inner wall (2), wherein the heating element (5), the water inlet (12), the water outlet (15) and the one or more temperature sensors (17, 18) are arranged within a vertical projection (52), inside the vessel (1), of the horizontal outer diameter of the insert (21), wherein a horizontal space (53) is present between the vertical projection and the inner wall (2).

2. The beverage dispenser (400) according to claim 1, wherein the vessel with double walls comprises a vacuum space between the double walls.

3. The beverage dispenser (400) according to claim 1, wherein the heater unit (100, 300) comprises a temperature sensor (17, 18) provided in the interior (8) of the vessel (1), and wherein the conduits (24, 25) for the at least one temperature sensor (17, 18) is provided in the bottom (1).

4. The beverage dispenser (400) according to claim 1, wherein the heater unit (100, 200, 300) comprises a first temperature sensor (17) received in the interior (8) of the vessel (1) and a second temperature sensor (18) received in the interior (8) of the vessel (1); wherein both temperature sensors (17, 18) are considered in a vertical direction, provided above the heating element (5); and the first temperature sensor (17), considered in the vertical direction, is located closer to the heating element (5) than the second temperature sensor (18).

5. The beverage dispenser (400) according to claim 4, wherein the first temperature sensor (17), considered in the vertical direction, is provided at a distance (B) of at most 2 cm above the heating element.

6. The beverage dispenser (400) according claim 4, wherein the second temperature sensor (18), considered in a vertical direction, is provided at a distance (C) of at most 2 cm below the outlet opening (16).

7. The beverage dispenser (400) according to claim 1, wherein the inlet opening (14) is located in the lower part of the bottom (9).

8. The beverage dispenser (400) according to claim 1, wherein said distance (A) between the heating element (5) and the bottom (9) is at most 35 mm.

9. The beverage dispenser (400) according to claim 1, wherein the distance (A) between the heating element (5) and the bottom (9) is at least 5 mm.

10. The beverage dispenser (400) according to claim 1, wherein said distance (A) between the heating element (5) and the bottom (9) is at most 30 mm.

11. The beverage dispenser (400) according to claim 1, wherein the distance (A) between the heating element (5) and the bottom (9) is 25 mm or less.

12. The beverage dispenser (400) according to claim 1, wherein the distance (A) between the heating element (5) and the bottom (9) is at least 8 mm.

13. The beverage dispenser (400) according to claim 1, wherein the distance (A) between the heating element (5) and the bottom (9) is at least 15 mm or more.

14. The beverage dispenser (400) according to claim 1, further comprising:
   a valve (44) connected with the water outlet (15) and configured to control an amount of warm water received by the mixing unit (46);
   a transport device (45) connected with the container holder (40) and adapted to control an amount of instant-ingredient received by the mixing unit (46); and
   a control unit (41) configured to control the valve (44) and the transport device (45).

15. The beverage dispenser (400) according to claim 1, wherein the horizontal outer diameter of the insert (21) in the single passageway (28) is between 25-50% of the horizontal inner diameter of the inner wall (2).

16. The beverage dispenser (400) according to claim 1, wherein the heating element (5) has a main heating portion with a plurality of helical windings, concentrically arranged around a main heating portion axis wherein the main heating portion is arranged in a lower half of the vessel (1).

17. The beverage dispenser (400) according to claim 16, wherein the main heating portion axis extends in a horizontal direction.

18. The beverage dispenser (400) according to claim 16, wherein the amount of helical windings is at least five.

19. A beverage dispenser for preparation of a warm instant drink, comprising:
   a heater unit adapted to generate warm water, the heating unit including
      a vessel adapted to hold water,
      wherein at least a portion of the vessel includes an inner wall and an outer wall and a space between the inner wall and the outer wall that is evacuated,
      an insert received through a single passageway of the vessel and connected to the vessel to seal an interior of the vessel,
      a water inlet connected to the vessel through the insert and including a plurality of inlet openings,
      wherein the inlet openings are adapted to discharge cold water received from the water inlet in a radial direction relative to a vertical axis,
      one or more temperature sensors connected to the vessel through the insert,
      a heating element connected to the vessel through the insert and arranged above the inlet openings within the vessel and adapted to heat discharged cold water to thereby generate warm water, and
      a water outlet connected to the vessel one of through the insert and at a ceiling of the vessel for discharging warm water generated by the heater unit;
   a container holder adapted to store instant-ingredient;
   a mixing unit including a proximal portion connected to the heater unit and the container unit, wherein the mixing unit is adapted to mix instant-ingredient received from the container holder with warm water received from the heating unit to thereby generate the warm instant drink;
   a nozzle configured to deliver the warm instant drink; and
   a rotor arranged between the proximal portion of the mixing unit and the nozzle and configured to control mixing of the instant-ingredient and the warm water; and
   wherein a horizontal outer diameter of the insert is smaller than a horizontal inner diameter of the inner wall, wherein the heating element, the water inlet, the water outlet and the one or more temperature sensors are arranged within a vertical projection, inside the vessel, of the horizontal outer diameter of the insert, wherein a horizontal space is present between the vertical projection and the inner wall.

20. The beverage dispenser according to claim 19, further comprising:
   a valve connected with the water outlet and configured to control an amount of warm water received by the mixing unit;
   a transport device connected with the container holder and adapted to control an amount of instant-ingredient received by the mixing unit; and
   a control unit configured to control the valve and the transport device.

21. The beverage dispenser according to claim 19, further comprising:
   a foil arranged within the evacuated space between the inner wall and the outer wall.

* * * * *